(12) United States Patent
Gilchrist et al.

(10) Patent No.: US 10,277,721 B2
(45) Date of Patent: Apr. 30, 2019

(54) PUZZLE-STYLE MODULAR ELECTRONIC DEVICES

(71) Applicant: International Business Machines Corporation, Armonk, NY (US)

(72) Inventors: James P. Gilchrist, Poughkeepsie, NY (US); Michael E. Gildein, Wappingers Falls, NY (US); Rajaram B. Krishnamurthy, Wappingers Falls, NY (US); Moses J. Vaughan, Mahwah, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 769 days.

(21) Appl. No.: 14/857,905

(22) Filed: Sep. 18, 2015

(65) Prior Publication Data

US 2017/0085686 A1    Mar. 23, 2017

(51) Int. Cl.
*H04M 1/02*    (2006.01)

(52) U.S. Cl.
CPC ........ *H04M 1/0254* (2013.01); *H04M 1/0252* (2013.01)

(58) Field of Classification Search
CPC .................................................. H04M 1/0254
See application file for complete search history.

(56) References Cited

U.S. PATENT DOCUMENTS

| | | | |
|---|---|---|---|
| 7,536,199 B2 | 5/2009 | Josenhans et al. | |
| 8,358,513 B2 | 1/2013 | Kim | |
| 8,509,848 B1 | 8/2013 | Cole | |
| 8,667,265 B1* | 3/2014 | Hamlet | H04L 9/0866 326/80 |
| 8,848,905 B1* | 9/2014 | Hamlet | H04K 1/04 380/35 |
| 8,939,838 B2 | 1/2015 | Alten et al. | |
| 2004/0259587 A1 | 12/2004 | Chadha | |
| 2010/0064883 A1 | 3/2010 | Gynes | |
| 2010/0332400 A1* | 12/2010 | Etchegoyen | G06F 21/32 705/75 |
| 2011/0093920 A1* | 4/2011 | Etchegoyen | G06F 21/121 726/3 |

FOREIGN PATENT DOCUMENTS

WO    2014089807 A1    6/2014

OTHER PUBLICATIONS

Chant,"Your Phone Will Go to Pieces", IEEE, 2015, pp. 44-47.

* cited by examiner

*Primary Examiner* — Simon P Kanaan
(74) *Attorney, Agent, or Firm* — Cantor Colburn LLP; Teddi Maranzano

(57) ABSTRACT

A puzzle-style modular electronic device is provided. The puzzle-style modular electronic device is activated based on detecting an interconnection of a plurality of block modules and determining whether the interconnection of the plurality of block modules matches an assembly orientation. Note that each of the plurality of block modules includes a processor, a memory, and at least one connection point through which the interconnection is established and that the interconnection of the plurality of block modules collectively forms the modular electronic device. Further, the puzzle-style modular electronic device authenticates a set of operations of the modular electronic device in response to the determining that the interconnection of the plurality of block modules matches the assembly orientation.

18 Claims, 6 Drawing Sheets

220

PUZZLE-STYLE MODULAR ELECTRONIC DEVICES

BACKGROUND

The present disclosure relates generally to puzzle-style modular electronic devices, and more specifically, to a puzzle-style smartphone constructed via block modules that enable security and customization.

In general, outdated hardware of a cell phone can leave users locked out of using the latest applications or receiving the latest operating system updates. In turn, while an average service contract length for a cell phone is a time period of 2 years, users are ready to part ways with their cell phones long before this time period due to the hardware of these cell phones becoming quickly outdated.

For example, as precision applications (e.g., jogging applications) that utilize the newest hardware (e.g., global positioning systems, compasses, gyroscopes, etc.) are released, cell phones that do not include the newest hardware cannot take advantage of these precision applications. There are currently no solutions in the cell phone market to easily incorporate the newest hardware on existing cell phones.

SUMMARY

Embodiments include a method, a system, and a computer program product with respect to a puzzle-style modular electronic device. The puzzle-style modular electronic device is activated based on detecting an interconnection of a plurality of block modules and determining whether the interconnection of the plurality of block modules matches an assembly orientation. Note that each of the plurality of block modules includes a processor, a memory, and at least one connection point through which the interconnection is established and that the interconnection of the plurality of block modules collectively forms the modular electronic device. Further, the puzzle-style modular electronic device authenticates a set of operations of the modular electronic device in response to the determining that the interconnection of the plurality of block modules matches the assembly orientation.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein relate to puzzle-style modular electronic devices, and more specifically, to a puzzle-style smartphone constructed via block modules that enable security and customization.

In general, puzzle-style modular electronic devices include a three dimensional spatial layout of block modules. The block modules, once connected within the puzzle-style modular electronic devices, intercommunicate to determine if a customer designed orientation is met. If the block modules are arranged according to the customer designed orientation, then an operability of the puzzle-style modular electronic device is unlocked and a customer may proceed with using the puzzle-style modular electronic device. In this way, security and customization are provided via manipulating a physical configuration of and/or interacting in a particular manner with the block modules. That is, various layouts of block modules can be used for security (e.g., unlocking of the puzzle-style modular electronic device), as well as unlocking of various modes of the puzzle-style modular electronic device (e.g., child mode vs. adult mode; user mode vs. administrator mode; office mode vs. personal use mode; confidential mode (ALL RED color block modules) vs. regular mode).

Figure 1:
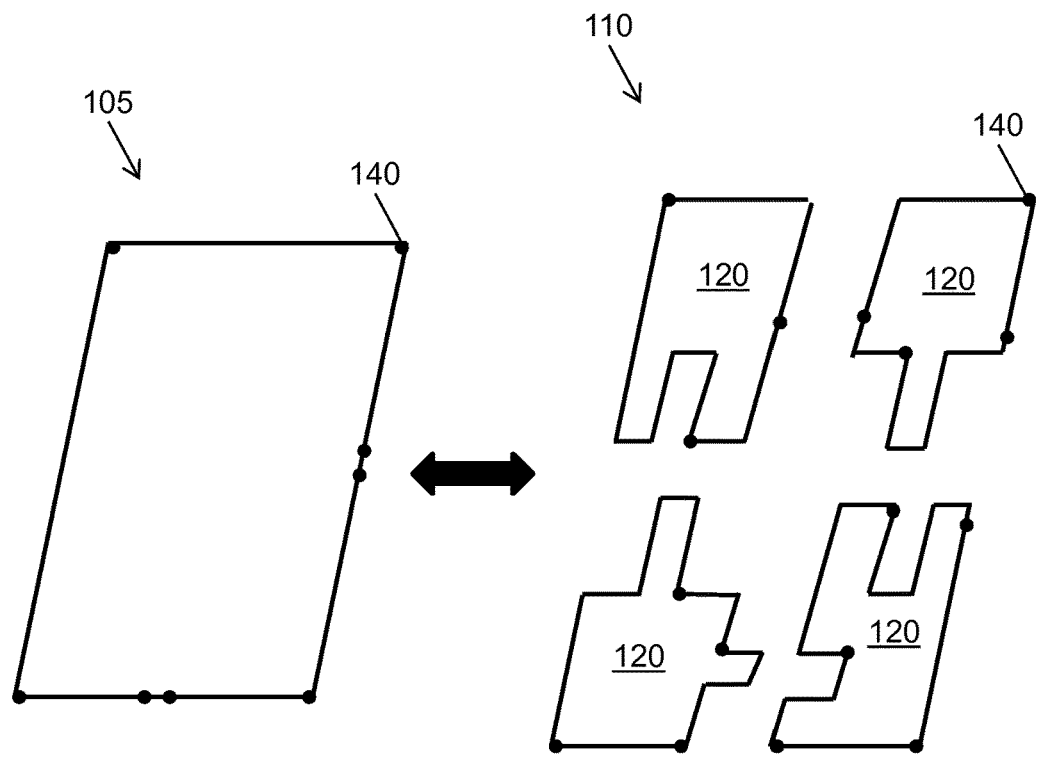
FIG. 1 depicts a puzzle-style modular electronic device according to an embodiment of the present invention.

Turning now to FIG. 1, a puzzle-style modular electronic device 100 is depicted according to an embodiment of the present invention. These various components of the puzzle-style modular electronic device 100 work in harmony to form a logical device grouping by plugging into one another and therefore creating a "puzzle"-style effect. The puzzle-style modular electronic device 100 can be a puzzle-style smartphone that includes a first plane 105 and a second plane 110. The second plane 110 includes a plurality of quadrants 120. The first and second planes 105, 110, along with the plurality of quadrants 120, are connected and communicate power and information via connection points 140.

The first plane 105 can include an input/display device, such as a touchscreen that provides an electronic visual display along with information processing system for receiving touch and/or tactile. Each of the plurality of quadrants 120 receives block modules. A block module is an integrated circuit (also referred to as a chip, microchip, field programmable array, microprocessor) that includes a set of electronic circuits on one small plate ("chip") of semiconductor material. The plurality of quadrants 120 may include a processor and a memory, which stores computer instructions, for carrying our functional operations, along with a memory component, a location component, a power component, and a longer term storage component. Examples of modules include a global positioning system chip, a camera, a gyroscope, an accelerometer, a battery, a memory, a microphone, a speaker, etc.

The planes 105, 110 and the plurality of quadrants 120 enable block modules to be physically arranged in a puzzle criteria or an assembly orientation that is used for authentication that can selectively enable certain operations.

Assembly orientation (e.g., customer designed orientation) can be chosen and/or configured in a variety of arrangements that require the block modules to be in a certain physical relation to each other to activate a particular function of the puzzle-style modular electronic device 100. Examples of assembly orientations include a square, a rectangle, a stacked orientation, a circle, an ellipse, a triangle, etc., or combination thereof. Assembly orientation can work in conjunction with tactile sequences to authorize use of the block modules and/or the puzzle-style modular electronic device 100. Further, two examples of configuring the assembly orientation and/or tactile sequences include utilizing a configuration tool and performing a master election operation.

The configuration tool (e.g., a software tool as described below) can be used to specify all arrangements and tactile sequences (e.g., tactile code). The configuration tool can be stored in all block modules and be executed to perform train of the blocks. The master election operation can be a "voting" process where a master block module is selected and a configuration sequence transferred to/verified by the master. Note that block modules may also be trained without the configuration tool by entering "training" mode that permits the master block module to execute training. Once the block modules are trained, authentication can be configured and/or performed.

Authentication relates to when a user wants to unlock the block modules and/or puzzle-style modular electronic device 100 for use. Authentication can include when a user sets a tactile code via an assembly orientation of the block modules, tactile forces, hand gestures, and the like (as further described below). For example, the puzzle criteria of a three dimensional arrangement of the block modules can be matched with a sequence of taps or tactile pressure (e.g., duration of pressure) on each block, as well as hand gestures. During authentication, the block modules communicate to determine whether the entered tactile code, along with a current assembly arrangement, matches a configured tactile code and/or assembly arrangement. If a master is employed, the master may be used as a central arrangement validation sequencer for validating the tactile code and/or assembly arrangement. Sounds, colors, etc. may be used if the assembly arrangement is not validated within a given time period.

Figure 2:
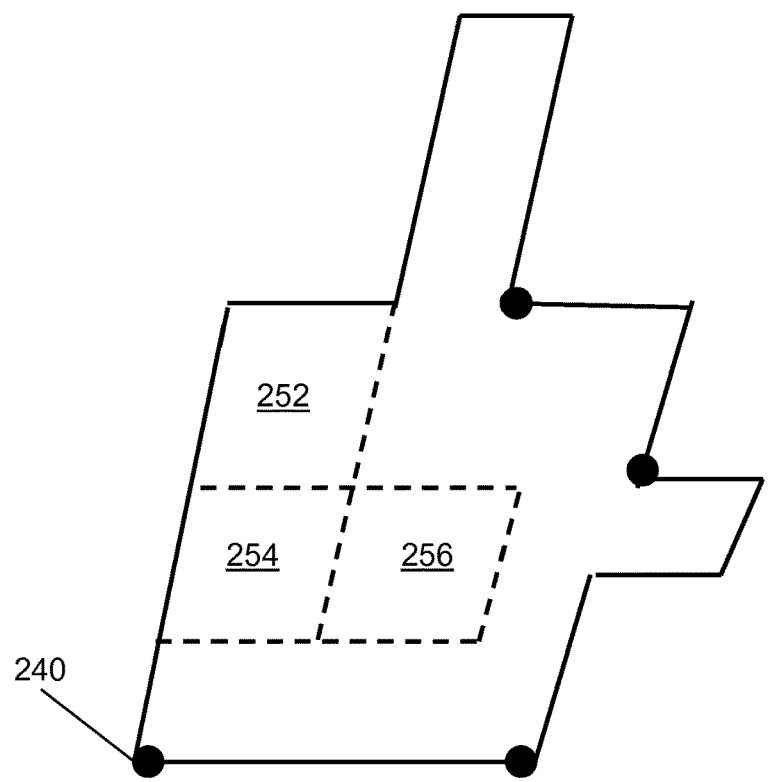
FIG. 2 depicts a quadrant of the puzzle-style smartphone according to an embodiment of the present invention.

Further, the physical interconnection and arrangement of the plurality of block modules can be utilized for authentication that selectively enables certain operations. That is, a customer can designate the block modules to be arranged on a single plane or within a quadrant in a corner shape as shown in FIG. 2 below. Once arranged in the shape of the rectangle, the puzzle-style modular electronic device 100 will activate an operation associated with the corner shape.

The plurality of block modules may further include tactile pressure surfaces that are individual displays. The tactile pressure surfaces may activate color, texture, and shades based on an amount of pressure, a length of contact, and/or a number of interactions across different faces of the plurality of block modules. In this way, the tactile pressure surfaces can receive a tactile code that can also be utilized for authentication that selectively enables certain operations. The tactile code is an ordered system of physical touches between an object external to the plurality of block modules (e.g., a finger). The physical touches can correspond to combination of the amount of pressure, the length of contact, and/or the number of interactions across different faces of the plurality of block modules. Taps and/or tactile pressure during an entry of the tactile code can change a color of each block and/or change the roughness/smoothness of the block surface (color changes along with surface changes allow a user to remember unlock/configuration change sequences, i.e., tactile codes). Thus, in an embodiment, the plurality of block modules may be independently arranged without the plurality of quadrants 120 and without the plane 105, as the individual displays of can combine to form a full screen.

In view of the above, the puzzle-style modular electronic device 100 can authenticate a user based on the plurality of block modules by matching an assembly orientation, receiving a tactile code due, and time based synchronization. A time based synchronization includes when a customer designed orientation is constructed and a tactile code is received within a time interval (e.g., 10 seconds, 20 seconds, 30 seconds, 60 seconds, etc.).

In an example embodiment, a puzzle-style smartphone (e.g., the puzzle-style modular electronic device) may be divided into quadrants. Each quadrant (e.g., kernel, functional, or no-op) adhere to design points to be usable by the puzzle-style smartphone. The design points of quadrants include the ability to communicate information (such as Wi-Fi packet transfer, power levels, need for/download of firmware updates) and can include an agnostic kernel that is used to activate and manage functionality of the building-block modules such that that quadrant is functional even when separated from the kernel quadrant. The design points include sectioned off portions of each quadrant to be utilized for various supplemental characteristics, such as a function module, location module, power module, inter-quadrant and screen interlocks (e.g., connection points 140), a storage module, etc.

Turning to FIG. 2, a quadrant 220 of the puzzle-style smartphone is shown according to an embodiment of the present invention. The quadrant 220 includes a function module 252, a power module 254, and a location module 256. In this way, each quadrant of the puzzle-style smartphone can include one or more block modules that correspond to these various supplemental characteristics.

The function module 252 can include quadrant function-specific hardware, such as a projector, camera, a camera, a gyroscope, an accelerometer, a microphone, a speaker, etc. The power module 254 can include independent power source, such as a battery or inductive charging mechanism. The location module 256 can include independent position hardware, such as a global positioning system chip. Quadrant interlocks can include connectors that transfer data and power among adjacent quadrants. Quadrant interlocks can be pluggable "teeth" on each quadrant, magnet like structures, induction, or any re-attachable adhesive device which can achieve the desired functionality as described. Screen interlocks can include connectors that transfer necessary power to the screen (note that data can be transferred via the kernel quadrant as described below). The storage module can include memory hardware used to hold module-specific or module communication information and temporary storage used for processing.

The kernel quadrant is an area of the puzzle-style smartphone that manages input/output requests from software, and translates them into data processing instructions for the puzzle-style smartphone and other components of the puzzle-style smartphone. That is, kernel quadrant itself serves as a centralized management agent for the puzzle-style smartphone as a whole. In addition to the design points described above, the kernel quadrant must contain the enhanced operability of a screen data connector (e.g., connection points 140), expanded storage module, power manager, power charging port, data manager, phone operating system, dedicated On/Off switch, wireless receiver, as well as a device processor.

The screen data connector transfers data (e.g., touch inputs and pixel data) to and from a touchscreen (e.g., the first module 105). The expanded storage module is configured to support computationally intense processing. The power manager can equally distribute power among the various quadrants and component of the puzzle-style smartphone. The power manager thus manages an overall "battery level" as opposed to 'n' levels (note that quadrant-specific battery levels are be available to the user in case they would like to charge only quadrants when needed). The power charging port is a physical alternative to inductive charger. The data manager handles management of data and communication to/from functional quadrants to the kernel quadrant for input into user use-case scenarios. The phone operating system enables device centric boot sequence, application management, and device management. The dedicated On/Off switch is a central interface to power on/off entire puzzle-style smartphone. The wireless receiver provides networking functionality to entire puzzle-style smartphone. The device processor provides baseline processing power to the entire puzzle-style smartphone.

In operation, the puzzle-style smartphone can include 'n+1' quadrants, where 1 is designated as a 'kernel' quadrant and 'n' functional augmentation quadrants. The puzzle-style smartphone can include quadrant groupings, such as a kernel quadrant and a combination of 'no-op' and functional quadrants depending on a user's need to create a puzzle-style smartphone of size 'n+1' quadrants. A kernel quadrant can include modules that manage input/output requests from software, and translates them into data processing instructions for the puzzle-style smartphone and other components of the puzzle-style smartphone. A functional augmentation quadrant can include modules that performs a specific operation within the puzzle-style smartphone. A 'no-op' or no-operation quadrant can include modules with no specific function other than those required by quadrant design points.

Further, the physical interconnection and arrangement of the quadrants (e.g., the plurality of block modules arranged in a square, a rectangle, a stacked orientation, etc.) can be utilized for authentication that enables certain operations to be selectively activated. That is, a customer can designate the plurality of block modules to be arranged on a single plane in a corner shape as shown in FIG. 2. Once arranged in the shape of the rectangle, the puzzle-style modular electronic device 100 will activate an operation associated with the corner shape. Note that the functional augmentation quadrants can be interchangeable with a 'no-op' quadrant to maintain a comfortable physical structure of the puzzle-style smartphone, even when the assembly orientation requires less block modules for authentication. That is, a no-op augmentation quadrant can also necessary to complete a puzzle-style smartphone grouping. (e.g., if an orientation requires 2 quadrants and it takes 4 quadrants to complete a puzzle-style smartphone shape, than 2 'no-op' quadrants may be utilized).

The plurality of block modules may further include tactile pressure surfaces that activate color, texture, and shades based on an amount of pressure, a length of contact, and/or a number of interactions across different faces of the plurality of block modules. In this way, the tactile pressure surfaces can receive a tactile code that can also be utilized for authentication that selectively enables certain operations. The tactile code is an ordered system of physical touches between an object external to the plurality of block modules (e.g., a finger). The physical touches can correspond to combination of the amount of pressure, the length of contact, and/or the number of interactions across different faces of the plurality of block modules.

In view of the above, the puzzle-style modular electronic device 100 can authenticate a user based on the plurality of block modules by matching an assembly orientation, receiving a tactile code due, and time based synchronization. A time based synchronization includes when a customer designed orientation is constructed and a tactile code is received within a time interval (e.g., 10 seconds, 20 seconds, 30 seconds, 60 seconds, etc.). Also, the amount of pressure or length of contact can change a color and/or shade of each of the plurality of block modules.

Figure 3:
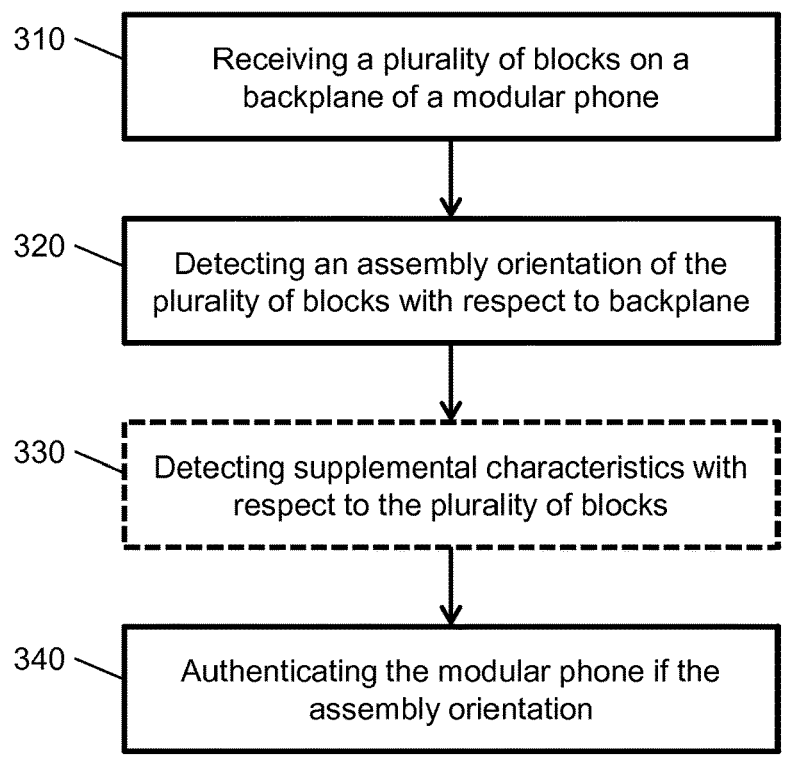
FIG. 3 depicts a process flow executed by a puzzle-style modular electronic device according to an embodiment of the present invention.

Turning now to FIG. 3, a process flow 300 executed by the puzzle-style modular electronic device 100 according to an embodiment of the present invention is illustrated. The process flow 300 begins at block 310, where the puzzle-style modular electronic device 100 receives a plurality of block modules on a backplane. The backplane can be a plane 110 divided into quadrants 120 that are configured to receive block modules (a plurality of modules). One of these quadrants 120 can be a kernel quadrant. The kernel quadrant of the puzzle-style modular electronic device 100 detects an interconnection of a plurality of block modules. The interconnection is established through the connection points 140.

Next, at block 320, the kernel quadrant determines whether the interconnection of plurality of block modules matches an assembly orientation. The assembly orientation is used for authentication that selectively enables certain operations. In addition, at dashed-block 330, the kernel quadrant can optionally detect supplemental characteristics of the plurality of block modules. The set of operations corresponds to the supplemental characteristics of the plurality of block modules. Next, at block 340, the kernel quadrant authenticates the set of operations in response to the determining that the interconnection of the plurality of block modules matches the assembly orientation.

Figure 4:
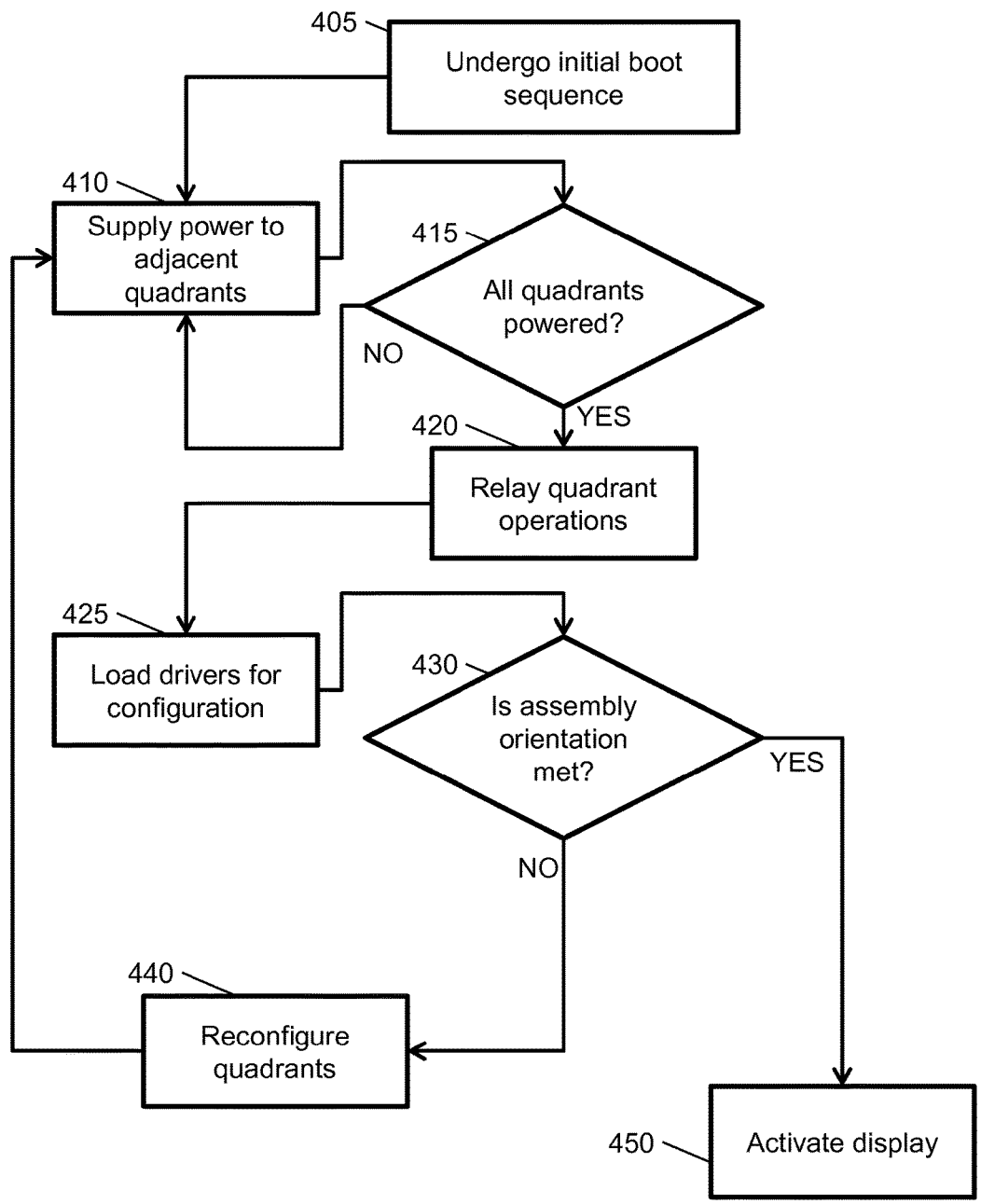
FIG. 4 depicts another process flow executed by a puzzle-style modular electronic device according to an embodiment of the present invention.

Turning now to FIG. 4, a process flow 400 executed by the puzzle-style modular electronic device 100 according to an embodiment of the present invention is illustrated. The process flow 400 is a configuration route where once a user or manufacturer has decided on a set of desired requirements, they can then use a software tool to assist in making this conception a reality. This software tool can operate as both a prototyping and validation instrument that will utilize the requirements as input and subsequently provide the user with the necessary hardware configuration. The user or manufacturer will also have an interface that will give them insight into what classes of applications can run with a chosen build as well as which specific modules are necessary to make the set of desired requirements possible. In this way, the user or manufacturer can then construct an actual phone using the necessary modules and validate the actual phone via the software tool's validation system.

The process flow 400 begins at block 405, where the puzzle-style modular electronic device 100 undergoes an initial boot sequence. That is, a kernel quadrant of the puzzle-style modular electronic device 100 undergoes an initial boot sequence once the puzzle-style modular electronic device 100 is activated, e.g., by the On/Off switch. Further, the puzzle-style modular electronic device 100 in operation can be activated through detection of operation and enablement/disablement of drivers for functionality, such that the kernel quadrant itself will detect what is currently connected to the puzzle-style modular electronic device 100 and will conduct the enablement/disablement of the necessary drivers.

Next, at block 410, the kernel quadrant supplies power to all adjacent quadrants, including any 'no-op' quadrants. Additionally, the kernel quadrant can send an activation signal to all adjacent quadrants. The powering and activating can ripple through the puzzle-style modular electronic device 100 until all quadrants are activated. Thus, a check at decision block 415 may be performed to determine if all quadrants are powered. If all quadrants are not powered, the process flow 400 returns to block 410 as indicated by the 'NO' arrow. If all quadrants are powered (e.g., all quadrants are activated), the process flow 400 proceeds to block 420 as indicated by the 'YES' arrow.

At block 420, the kernel quadrant receives a relay of the configuration designations of the activated quadrants. The relay determines a physical configuration of the modules in each quadrant. Then, at block 425, the kernel quadrant loads drivers for the configurations. Next, at decision block 430, the kernel quadrant determines/validates whether the activated quadrants and their respective modules match an assembly orientation.

If the assembly orientation is not met, the process flow 400 proceed to block 440 as indicated by the 'NO' arrow. At block 440, the power is removed from the quadrants and the modules on each quadrant are physically reconfigured. In one example operation, the kernel quadrant can warn the user or manufacturer that the phone quadrants and/or modules must be reconfigured. Then, the process returns to block 410.

If the assembly orientation is met, the process flow 400 proceeds to block 450 as indicated by the 'YES' arrow. At block 440, the kernel quadrant activates a display (e.g., plane 105) of the puzzle-style modular electronic device 100 and enables operations that correspond to the confirmed assembly orientation. In one example operation, the kernel quadrant can display to the user or manufacturer an on-screen configuration of the puzzle-style modular electronic device 100. The on-screen configuration provide the user or manufacturer with various functional augmentation quadrants whose operation can be manipulated from providing surplus power, boosting of the overall phone antenna signal, document projection, audio/video recording, the ability to acquire biometric inputs, etc.

Figure 5:
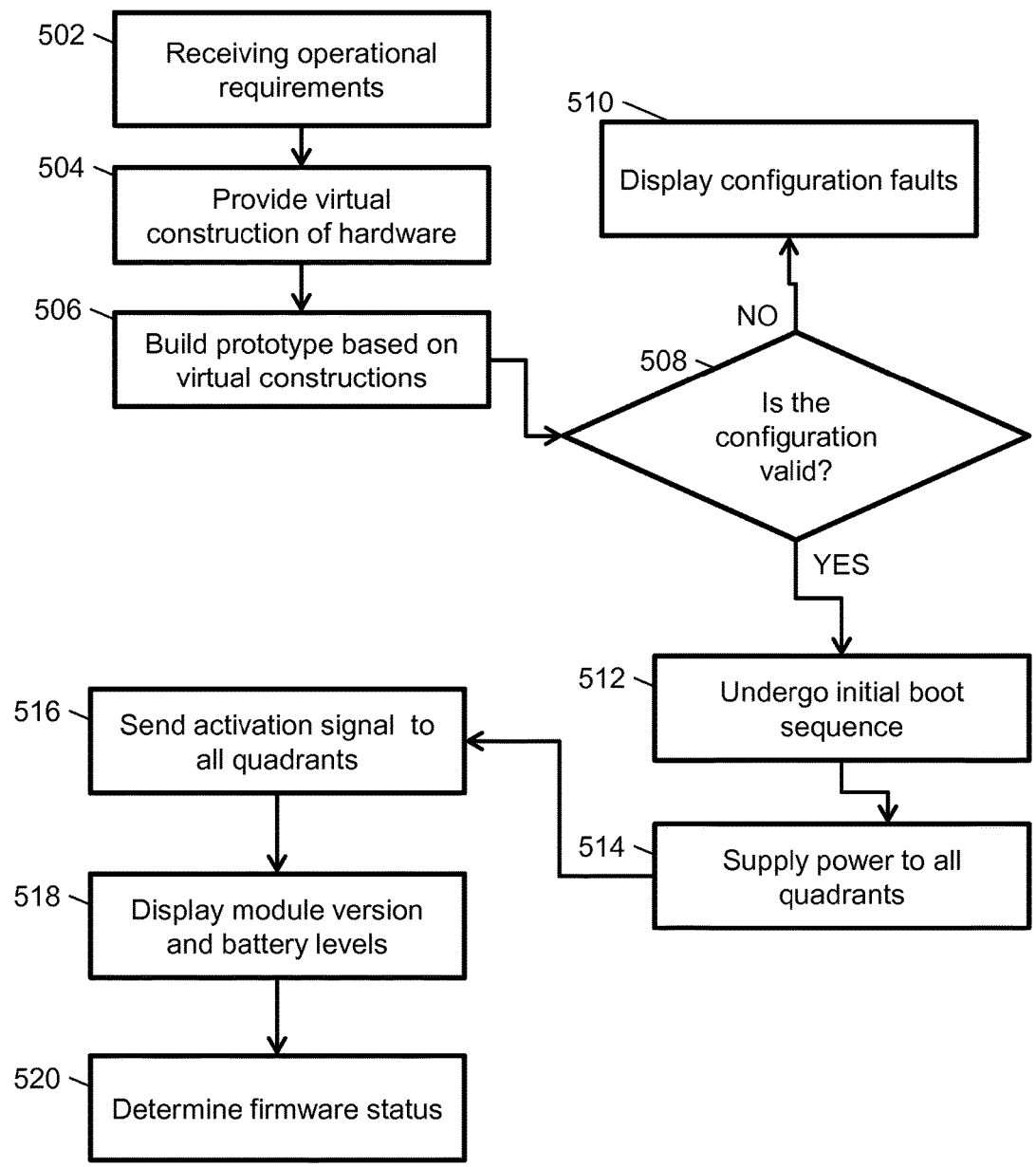
FIG. 5 depicts another process flow executed by a puzzle-style modular electronic device according to an embodiment of the present invention.

Turning now to FIG. 5, a process flow 500 executed by the software tool and the puzzle-style modular electronic device 100 according to an embodiment of the present invention is show. The process flow 500 begins at block 502, where operational requirements are received by a software tool. That is, a use may provide operational requires to the software tool installed on a processing system of FIG. 6. The software tool in turn, at block 504 provides a virtual construction of the hardware that is needed to meet the operational requirements. Then, at block 506, the user or manufacturer builds a prototype based on the virtual construction. Next, at decision block 508, the kernel quadrant determines/validates whether the prototype configuration is valid in view of the operational requirements. If the prototype configuration is not valid, the process flow 500 proceed to block 510 as indicated by the 'NO' arrow. At block 510, the software tool provides/displays possible issues with the operational requirements and/or the prototype configuration. In one example operation, the software tool can warn the user or manufacturer that to reconfigured the prototype configuration. If the prototype configuration is valid, the process flow 500 proceeds to block 512 as indicated by the 'YES' arrow.

At block 512, the puzzle-style modular electronic device 100 undergoes an initial boot sequence. That is, a kernel quadrant of the puzzle-style modular electronic device 100 undergoes an initial boot sequence once the puzzle-style modular electronic device 100 is activated, e.g., by the On/Off switch. Then, at block 514, the kernel quadrant supplies power to all adjacent quadrants, including any 'no-op' quadrants. Then, at block 516, the kernel quadrant sends an activation signal to all adjacent quadrants. The powering and activating can ripple through the puzzle-style modular electronic device 100 until all quadrants are activated. With all quadrants powered and activated), the process flow 400 proceeds to block 518 where the kernel quadrant can display to the user or manufacturer an on-screen configuration of the puzzle-style modular electronic device 100, with module versions and battery levels. Then, at block 520, the kernel quadrant determines a firmware status for the modules of the module versions and performs updates as necessary (e.g., automatically connecting to and downloading from an external system the latest firmware versions).

Figure 6:
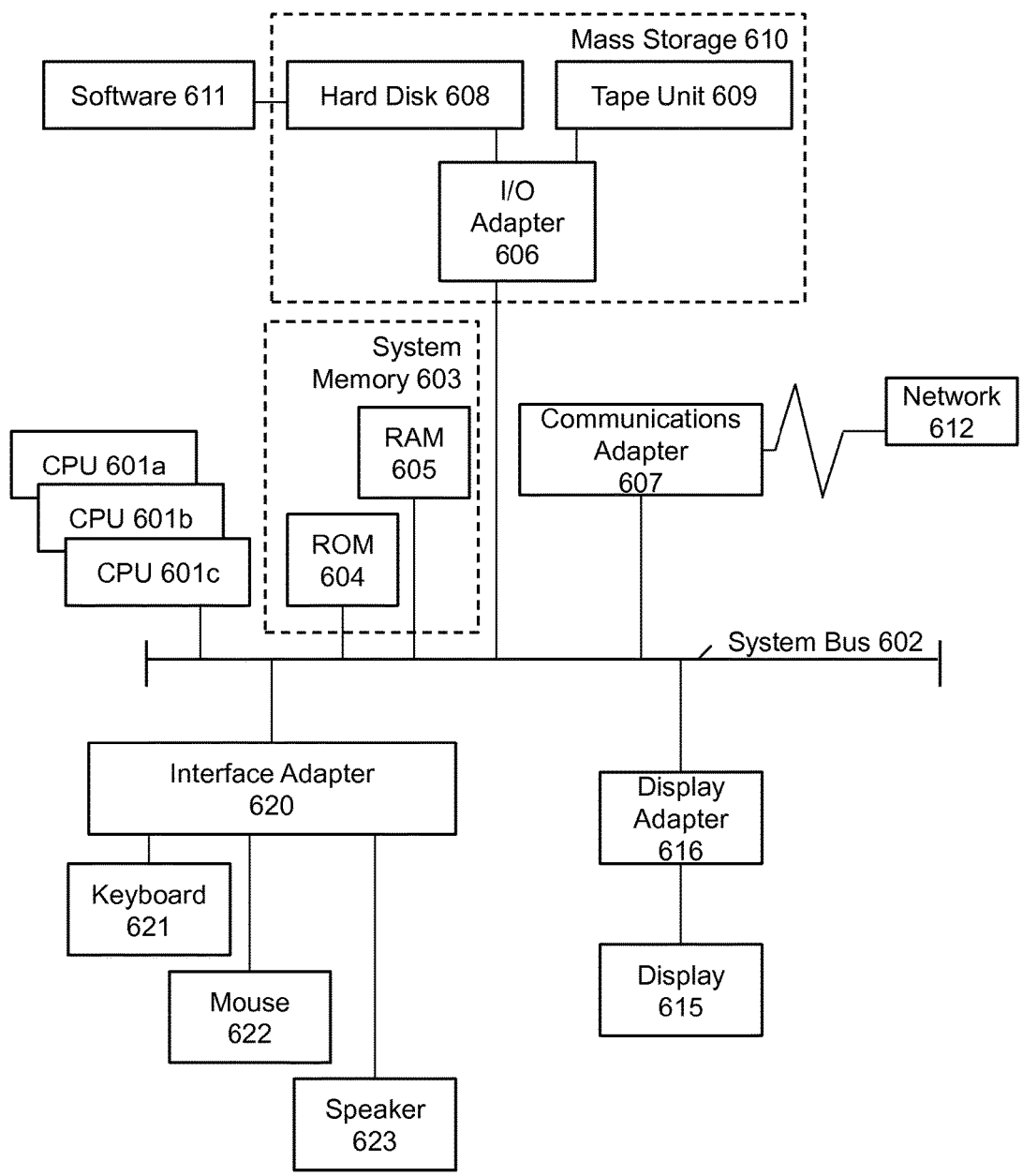
FIG. 6 depicts a processing system of a puzzle-style modular electronic device according to an embodiment of the present invention.

Referring now to FIG. 6, a puzzle-style modular electronic device is shown as a processing system 600 embodiment for implementing the teachings herein. The processing system 600 can include a plurality of block modules, where each module corresponds to an hardware and/or software element of the processing system 600. In this embodiment, the processing system 600 has one or more central processing units (processors) 601*a*, 601*b*, 601*c*, etc. (collectively or generically referred to as processor(s) 601). The processors 601, also referred to as processing circuits, are coupled via a system bus 602 to system memory 603 and various other components. The system memory 603 can include read only memory (ROM) 604 and random access memory (RAM) 605. The ROM 604 is coupled to system bus 602 and may include a basic input/output system (BIOS), which controls certain basic functions of the processing system 600. RAM is read-write memory coupled to system bus 602 for use by processors 601.

FIG. 6 further depicts an input/output (I/O) adapter 606 and a network adapter 607 coupled to the system bus 602. I/O adapter 606 may be a small computer system interface (SCSI) adapter that communicates with a hard disk 608 and/or tape storage drive 609 or any other similar component. I/O adapter 606, hard disk 608, and tape storage drive 609 are collectively referred to herein as mass storage 610. Software 611 for execution on processing system 600 may be stored in mass storage 610. The mass storage 610 is an example of a tangible storage medium readable by the processors 601, where the software 611 (e.g., the software tool) is stored as instructions for execution by the processors 601 to perform a method, such as the process flows of FIGS. 3-5. Network adapter 607 interconnects system bus 602 with an outside network 612 enabling processing system 600 to communicate with other such systems. A screen (e.g., a display monitor) 615 is connected to system bus 602 by display adapter 616, which may include a graphics controller to improve the performance of graphics intensive applications and a video controller. In one embodiment, adapters 606, 607, and 616 may be connected to one or more I/O buses that are connected to system bus 602 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 602 via an interface adapter 620 and the display adapter 616. A keyboard 621, mouse 622, and speaker 623 can be interconnected to system bus 602 via interface adapter 620, which may include, for example, a Super I/O chip integrating multiple device adapters into a single integrated circuit.

Thus, as configured in FIG. 6, processing system 605 includes processing capability in the form of processors 601, and, storage capability including system memory 603 and mass storage 610, input means such as keyboard 621 and mouse 622, and output capability including speaker 623 and display 615. In one embodiment, a portion of system memory 603 and mass storage 610 collectively store an operating system, such as the z/OS or AIX operating system from IBM Corporation, to coordinate the functions of the various components shown in FIG. 6.

Technical effects and benefits of embodiments of a puzzle-style modular electronic device include solving high turnover issue, providing customers with a better sense of security in their purchase, and decreasing an environmental footprint of wasteful electronics. Technical effects and benefits of embodiments of a puzzle-style modular electronic device also include providing consumers with a 100% customizable smartphone that can include hardware respective to execute a set of applications deem pertinent by a customer. In turn, embodiments of a puzzle-style modular electronic device would allow customers to maximize battery life of their devices, purchase cost effective solutions with inherent flexibility, etc., along with providing a layer of physical authorization and security not seen on contemporary cell phones.

The technical effects and benefits of embodiments of the software tool include providing the user or manufacturer with various preset configurations and possible alterations, with the ability to validate potential module groupings, with preview abilities for module groupings, and with the ability to load the kernel quadrant with the necessary hardware device drivers to ensure a smooth workflow. The technical effects and benefits of embodiments of the software tool include having a central interface to keep the various module firmware up to date.

Thus, embodiments of the puzzle-style modular electronic device provide customers with the ability to determine and purchase what they feel is necessary in a smartphone while providing advances users the ability to customize to their functional desires. For example, if the customer finds that they must have location sensing functionality while on a road trip but not while they are at work, the choice will now be in the hands of the consumer, because the puzzle-style modular electronic device ultimately enable a fully customizable phone.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of block modules in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or block modules. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or block modules.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or block modules.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block modules may occur out of the order noted in the Figures. For example, two block modules shown in succession may, in fact, be executed substantially concurrently, or the block modules may sometimes be executed in the reverse order, depending upon the functionality involved. It will also be noted that each block of the block diagrams and/or flowchart illustration, and combinations of block modules in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for activating a modular electronic device, comprising:
    detecting an interconnection of a plurality of block modules,
        wherein each of the plurality of block modules comprises a processor, a memory, and at least one connection point through which the interconnection is established;
    determining whether the interconnection of the plurality of block modules matches an assembly orientation,
        wherein the interconnection of the plurality of block modules collectively forms the modular electronic device; and
    authenticating a set of operations of the modular electronic device based on a combination of matching the assembly orientation and receiving a tactile code, in response to the determining that the interconnection of the plurality of block modules matches the assembly orientation, the assembly orientation comprising the plurality of block modules to be in a predefined physical relation to each other to activate the modular electronic device or one or more functions the modular electronic device.

2. The method of claim 1, wherein the detecting of the interconnection of the plurality of block modules of the modular electronic device include receiving each block module on a backplane of the modular electronic device.

3. The method of claim 1, comprising:
    detecting supplemental characteristics of the plurality of block modules,
    wherein the set of operations corresponds to the supplemental characteristics of the plurality of block modules.

4. The method of claim 3, wherein the supplemental characteristics comprise hardware features particular to each of the plurality of block modules.

5. The method of claim 1, wherein at least one of the plurality of block modules includes a tactile pressure surface that based on at least one of an amount of pressure, a length of contact, and a number of interactions.

6. The method of claim 1, wherein at least one of the plurality of block modules includes a touchscreen that provides an electronic visual and information processing system for receiving tactile contact.

7. The method of claim 1, wherein the assembly orientation is an arrangement of the plurality of block modules within the modular electronic device.

8. The method of claim 1, wherein the modular electronic device is a puzzle-style smartphone.

9. A system for activating a modular electronic device, comprising:
    a plurality of block modules, each block module comprising a processor, a memory, and at least one connection point through which the interconnection is established,
    the system configured to:
    detect an interconnection of a plurality of block modules;
    determine whether the interconnection of the plurality of block modules matches an assembly orientation,
        wherein the interconnection of the plurality of block modules collectively forms the modular electronic device; and authenticate a set of operations of the modular electronic device based on a combination of matching the assembly orientation and receiving a tactile code, in response to the determining that the interconnection of the plurality of block modules matches the assembly orientation, the assembly orientation comprising the plurality of block modules to be in a predefined physical relation to each other to activate the modular electronic device or one or more functions the modular electronic device.

10. The system of claim 9, wherein the detecting of the interconnection of the plurality of block modules of the modular electronic device include receive each block module on a backplane of the modular electronic device.

11. The system of claim 9, the system configured to:
detect supplemental characteristics of the plurality of block modules,
wherein the set of operations corresponds to the supplemental characteristics of the plurality of block modules.

12. The system of claim 11, wherein the supplemental characteristics comprise hardware features particular to each of the plurality of block modules.

13. The system of claim 9, wherein at least one of the plurality of block modules includes a tactile pressure surface that based on at least one of an amount of pressure, a length of contact, and a number of interactions.

14. The system of claim 9, wherein at least one of the plurality of block modules includes a touchscreen that provides an electronic visual and information processing system for receiving tactile contact.

15. The system of claim 9, wherein the assembly orientation is an arrangement of the plurality of block modules within the modular electronic device.

16. The system of claim 9, wherein the modular electronic device is a puzzle-style smartphone.

17. A computer program product, the computer program product comprising a non-transitory computer readable storage medium having program instructions for activating a modular electronic device embodied therewith, the program instructions executable by the modular electronic device to cause the modular electronic device to perform operations comprising:
detecting an interconnection of a plurality of block modules,
wherein each of the plurality of block modules comprises a processor, a memory, and at least one connection point through which the interconnection is established;
determining whether the interconnection of the plurality of block modules matches an assembly orientation,
wherein the interconnection of the plurality of block modules collectively forms the modular electronic device; and
authenticating a set of operations of the modular electronic device based on a combination of matching the assembly orientation and receiving a tactile code, in response to the determining that the interconnection of the plurality of block modules matches the assembly orientation, the assembly orientation comprising the plurality of block modules to be in a predefined physical relation to each other to activate the modular electronic device or one or more functions the modular electronic device.

18. The computer program product of claim 17, wherein the detecting of the interconnection of the plurality of block modules of the modular electronic device include receiving each block module on a backplane of the modular electronic device.

* * * * *